(12) United States Patent
Lutz et al.

(10) Patent No.: US 11,065,956 B2
(45) Date of Patent: Jul. 20, 2021

(54) DRIVE DEVICE FOR A MOTOR VEHICLE

(71) Applicant: SCHAEFFLER TECHNOLOGIES AG & CO. KG, Herzogenaurach (DE)

(72) Inventors: Christian Lutz, Creußen (DE); Philip Wurzberger, Nuremberg (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/613,251

(22) PCT Filed: May 24, 2018

(86) PCT No.: PCT/DE2018/100500
§ 371 (c)(1),
(2) Date: Nov. 13, 2019

(87) PCT Pub. No.: WO2019/001618
PCT Pub. Date: Jan. 3, 2019

(65) Prior Publication Data
US 2020/0171941 A1 Jun. 4, 2020

(30) Foreign Application Priority Data
Jun. 29, 2017 (DE) ...................... 10 2017 114 481.1

(51) Int. Cl.
*F16H 3/46* (2006.01)
*B60K 17/08* (2006.01)
*F16H 3/62* (2006.01)
*F16H 61/22* (2006.01)
*B60K 1/00* (2006.01)

(52) U.S. Cl.
CPC ............... *B60K 17/08* (2013.01); *F16H 3/62* (2013.01); *F16H 61/22* (2013.01); *B60K 2001/001* (2013.01); *B60Y 2400/73* (2013.01); *F16H 2200/0021* (2013.01);
(Continued)

(58) Field of Classification Search
CPC . F16H 3/001; F16H 3/006; F16H 3/46; F16H 3/56; F16H 3/62; F16H 2003/445; F16H 2200/201; F16H 2200/2035; F16H 2200/2038; F16H 2200/2097; B60K 17/08
See application file for complete search history.

(56) References Cited

U.S. PATENT DOCUMENTS 1,744,182 A 1/1930 Vincent
2,570,327 A 10/1951 Dodge
(Continued)

FOREIGN PATENT DOCUMENTS

DE 102010023948 A1 1/2011
GB 438459 11/1935

*Primary Examiner* — Edwin A Young
(74) *Attorney, Agent, or Firm* — Dickinson Wright PLLC

(57) ABSTRACT

A drive device for a motor vehicle includes a drive machine and a transmission device having a triple planetary great set and having a first and second clutch, wherein the triple planetary gear set has a plurality of triple planet gears, wherein each triple planet gear includes a first gear, a second gear, and a third gear. The three gears of each triple planet gear are connected to each other for conjoint rotation and are jointly rotatably accommodated on a planet carrier, and the drive machine is connected to the triple planetary gear set by the first clutch and a first sun gear or by the second clutch and a second sun gear.

18 Claims, 1 Drawing Sheet

(52) U.S. Cl.
CPC .............. *F16H 2200/2005* (2013.01); *F16H 2200/2035* (2013.01); *F16H 2200/2097* (2013.01)

(56) References Cited

U.S. PATENT DOCUMENTS

| | | | | |
|---|---|---|---|---|
| 2,697,368 | A | | 12/1954 | Winther et al. |
| 3,188,885 | A | * | 6/1965 | Fisher ................ F16D 67/00 475/55 |
| 3,240,083 | A | * | 3/1966 | Stoddard ............. F16H 3/722 475/94 |
| 3,835,732 | A | * | 9/1974 | Mori .................. F16H 3/66 475/276 |
| 4,805,489 | A | | 2/1989 | F'Geppert |
| 7,963,878 | B2 | | 6/2011 | Nardelli |
| 9,302,580 | B2 | * | 4/2016 | Smetana ............. B60K 1/00 |
| 2002/0086755 | A1 | * | 7/2002 | Hamai ................ F16H 3/724 475/5 |
| 2008/0248913 | A1 | * | 10/2008 | Kato .................. F16H 3/66 475/276 |
| 2013/0252780 | A1 | * | 9/2013 | Ohnemus ............. F16H 3/66 475/277 |
| 2014/0073473 | A1 | * | 3/2014 | Maurer ............... F16H 3/66 475/279 |
| 2014/0235394 | A1 | * | 8/2014 | Smetana ............. B60W 10/115 475/151 |
| 2014/0287866 | A1 | * | 9/2014 | Sugino ............... F16H 57/08 475/269 |

* cited by examiner

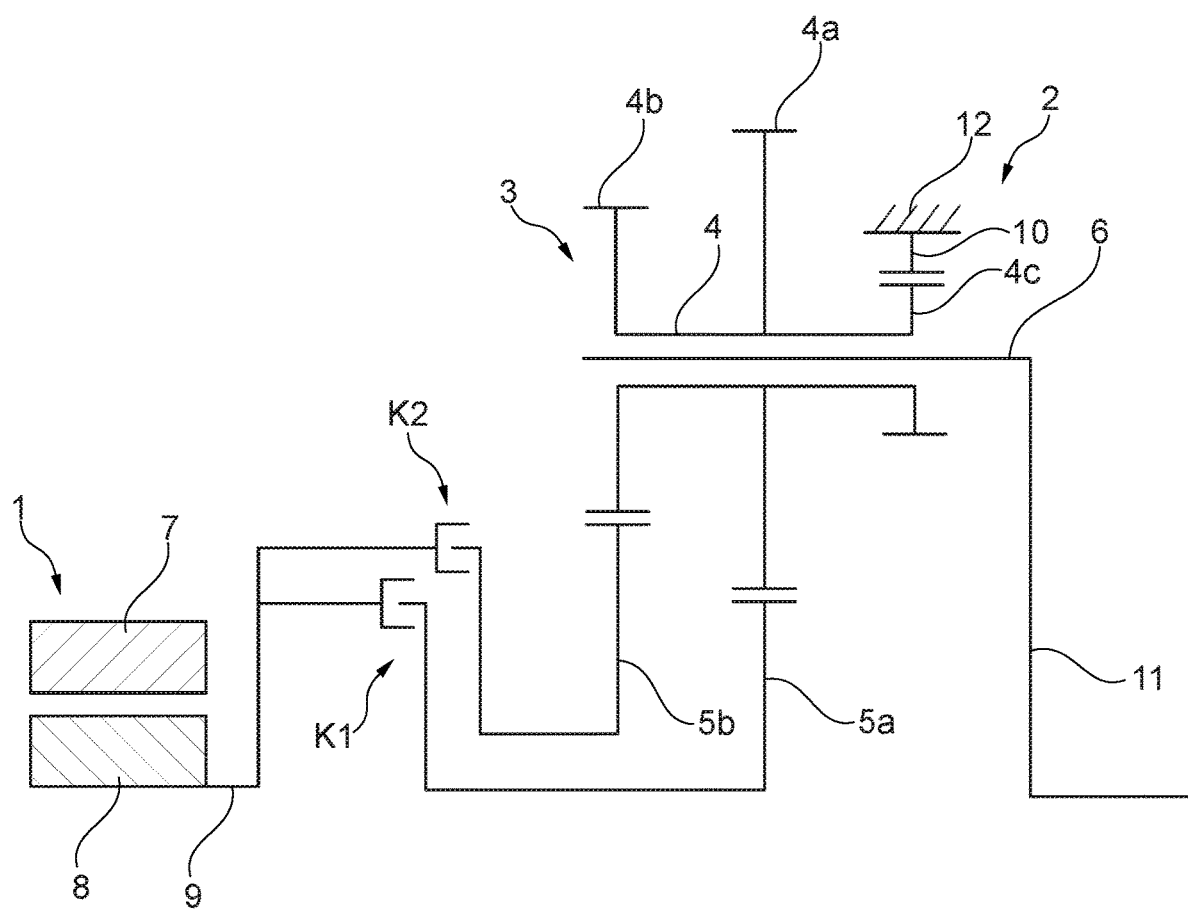

DRIVE DEVICE FOR A MOTOR VEHICLE

CROSS-REFERENCE TO RELATED APPLICATIONS

This application is the U.S. National Phase of PCT/DE2018/100500 filed May 24, 2018, which claims priority to DE 10 2017 114 481.1 filed Jun. 29, 2017, the entire disclosures of which are incorporated by reference herein.

TECHNICAL FIELD

The disclosure relates to a drive apparatus having a transmission apparatus for a motor vehicle.

BACKGROUND

A drive unit is apparent from DE 10 2010 023 948 A1. The drive unit comprises a jacket housing which defines a hollow interior space which extends along the primary axle, and a hollow shaft which is arranged in the hollow interior space of the jacket housing and extends along the primary axle, and an electric motor which is arranged in the hollow interior space of the jacket housing and surrounds a section of the hollow shaft radially. The electric motor is connected functionally to the hollow shaft in such a way that the hollow shaft rotates about the primary axis in response to operation of the electric motor. Furthermore, the drive unit comprises at least one gearwheel set which is arranged in a spaced apart relationship with respect to the electric motor along the primary axis. The at least one gearwheel set is in functional engagement with the hollow shaft, and is configured for rotation about the primary axis. Furthermore, the drive unit comprises at least one output shaft which is arranged at least partially in the hollow internal space of the jacket housing and extends along the primary axis. The at least one output shaft is connected rotatably to the at least one gearwheel set and is configured for rotation about the primary axis. The at least one gearwheel set is provided to rotate the at least one output shaft about the primary axis at a rotary speed which is lower than the rotary speed of the hollow shaft.

U.S. Pat. No. 2,570,327 A describes a drive apparatus having a triple planetary set, to which the drive unit is coupled via a first clutch and a first sun gear or via a second clutch and a second sun gear.

SUMMARY

The disclosure includes the technical teaching that closing of the first clutch and opening of the second clutch realizes a first transmission ratio, closing of the second clutch and opening of the first clutch realizing a second transmission ratio. Furthermore, closing of the two clutches realizes a transmission lock. Opening of the two clutches realizes a transmission freewheel. A third clutch may be arranged between the drive unit and the drive shaft, in order to decouple the drive unit from the transmission apparatus in the case of a transmission lock.

Two gearwheels which are in tooth engagement with one another are provided for the transmission of a torque and a rotational speed from the one gearwheel to the other gearwheel. A "gearwheel" may be understood to mean, for example, a sun gear and an internal gear.

The term "clutch" may be understood to mean an apparatus which has at least one open and one closed state. In the open state, the clutch does not transmit any torque. Therefore, the clutch transmits a torque only in an at least partially closed state between two elements which interact with the clutch, in particular between the drive shaft and the respective sun gear. The clutch can be configured both as a power shift element, in particular as a friction clutch, and as a positively locking switching element, in particular as a claw coupling. In particular, the clutch can be actuated by an actuator, in order to bring about opening or closing of the clutch. The actuator can be configured such that it can be actuated hydraulically, electromechanically, electromagnetically or, for example, also pneumatically.

The drive unit may be configured as an electric machine with a stator and a rotor, the rotor being connected fixedly to a drive shaft so as to rotate with it. The drive unit may be configured axially adjacently with respect to the transmission apparatus.

Furthermore, the drive shaft may be coupled via the first clutch to the first sun gear, the first sun gear being in tooth engagement with the first gearwheel. Furthermore, the drive shaft may be coupled via the second clutch to the second sun gear, the second sun gear being in tooth engagement with the second gearwheel. The third gearwheel may be in tooth engagement with an internal gear which is fixed in a stationary manner. In particular, the internal gear is connected fixedly to a housing so as to rotate with it.

The disclosure includes the technical teaching that the planetary carrier is connected fixedly to an output shaft of the transmission apparatus so as to rotate with it. As a consequence, the planetary carrier serves as an output shaft of the planetary transmission. In accordance with one preferred embodiment, the planetary carrier can also be connected to a further gear mechanism, in particular to a differential. The output shaft is arranged coaxially with respect to the drive shaft.

In particular, the disclosure relates to an electric drive axle for a motor vehicle, comprising a drive apparatus having a drive unit and having a transmission apparatus.

BRIEF DESCRIPTION OF THE DRAWINGS

Further measures which improve the disclosure will be shown in greater detail in the following text together with the description of one preferred exemplary embodiment of the disclosure on the basis of the FIG. 1. FIG. 1 shows a simplified diagrammatic illustration of a drive apparatus according to the disclosure.

DETAILED DESCRIPTION

In accordance with FIG. 1, a drive apparatus according to the disclosure for a motor vehicle (not shown here) has a drive unit 1 and a transmission apparatus 2 with a triple planetary gear set 3. The triple planetary gear set 3 has a plurality of triple planetary gears 4, merely one triple planetary gear 4 being shown on account of the selected illustration. Each triple planetary gear 4 has a first gearwheel 4a, a second gearwheel 4b and a third gearwheel 4c, the three gearwheels 4a, 4b, 4c of the respective triple planetary gear 4 being connected fixedly to one another so as to rotate together, and being received jointly on a planetary carrier 6 such that they can be rotated. The planetary carrier 6 is connected fixedly to an output shaft 11 of the transmission apparatus 2 so as to rotate with it.

The triple planetary gear set 3 is connected to a first sun gear 5a, to a second sun gear 5b and to an internal gear 10. Here, the first gearwheel 4a is in tooth engagement with the first sun gear 5a, the second gearwheel 4b being in tooth engagement with the second sun gear 5b, and the third gearwheel 4c being in tooth engagement with the internal gear 10.

Furthermore, the transmission apparatus 2 has a first and second clutch K1, K2. The drive unit 1 is configured as an electric machine with a stator 7 and a rotor 8, the rotor 8 being connected fixedly to a drive shaft 9 so as to rotate with it. The drive shaft 9 is arranged coaxially with respect to the output shaft 11. Furthermore, the drive shaft 9 can be coupled via the first clutch K1 to the first sun gear 5a. Furthermore, the drive shaft 9 can be coupled via the second clutch K2 to the second sun gear 5b. Here, closing of the first clutch K1 and opening of the second clutch K2 realizes a first transmission ratio, closing of the second clutch K2 and opening of the first clutch K1 realizing a second transmission ratio. A transmission freewheel is realized by way of opening of the two clutches K1, K2. Closing of the two clutches K1, K2 realizes a transmission lock.

LIST OF DESIGNATIONS

1 Drive unit
2 Transmission apparatus
3 Triple planetary gear set
4 Triple planetary gear
4a, 4b, 4c Gearwheel
5a, 5b Sun gear
6 Planetary carrier
7 Stator
8 Rotor
9 Drive shaft
10 Internal gear
11 Output shaft
12 Housing
K1 First clutch
K2 Second clutch

The invention claimed is:

1. A drive apparatus for a motor vehicle, comprising a drive unit and a transmission apparatus with a triple planetary gear set and with a first and second clutch, the triple planetary gear set having a plurality of triple planetary gearwheels, each triple planetary gearwheel having a first gearwheel, a second gearwheel and a third gearwheel, the three gearwheels of the respective triple planetary gearwheel being connected to one another fixedly so as to rotate together and being received jointly on a planetary carrier such that they can be rotated, wherein the drive unit is coupled via the first clutch and a first sun gear or via the second clutch and a second sun gear to the triple planetary gear set, wherein;
the third gearwheel is in tooth engagement with an internal gear which is fixed in a stationary manner, and opening of the two clutches realizes a transmission freewheel and a closing of the two clutches realizes a transmission lock.

2. The drive apparatus as claimed in claim 1,
wherein the drive unit is configured as an electric machine with a stator and a rotor, the rotor being connected fixedly to a drive shaft so as to rotate with it.

3. The drive apparatus as claimed in claim 2,
wherein the drive shaft can be coupled via the first clutch to the first sun gear, the first sun gear being in tooth engagement with the first gearwheel.

4. The drive apparatus of claim 2,
wherein the drive shaft can be coupled via the second clutch to the second sun gear, the second sun gear being in tooth engagement with the second gearwheel.

5. The drive apparatus of claim 4,
wherein the planetary carrier is connected fixedly to an output shaft of the transmission apparatus so as to rotate with it.

6. The drive apparatus of claim 5,
wherein the drive shaft is arranged coaxially with respect to the output shaft.

7. The drive apparatus of claim 1,
wherein closing of the first clutch and opening of the second clutch realizes a first transmission ratio, closing of the second clutch and opening of the first clutch realizing a second transmission ratio.

8. A drive device for a motor vehicle comprising:
a drive machine; and
a transmission device having a triple planetary great set and having a first and second clutch, wherein the triple planetary gear set has a plurality of triple planet gears, wherein each triple planet gear includes a first gear, a second gear, and a third gear, wherein the first gear, second gear, and third gear are connected to each other for conjoint rotation and are jointly rotatably accommodated on a planet carrier, wherein the drive machine is selectively connected to the triple planetary gear set by the first clutch and a first sun gear or by the second clutch and a second sun gear, wherein the first clutch and second clutch are configured to realize a first transmission ratio in response to closing of the first clutch and opening of the second clutch, wherein the first clutch and second clutch are further configured to realize a second transmission ratio in response to closing of the second clutch and opening of the first clutch, wherein the first clutch and the second clutch are further configured to realize a transmission lock in response to closing the first clutch and the second clutch.

9. The drive device of claim 8, wherein the drive device includes a third clutch arranged between the drive machine and a drive shaft and configured to decouple the drive machine from the transmission device in response to a transmission lock.

10. The drive device of claim 8, wherein the drive machine is an electrical machine with a stator and a rotor, wherein the rotor is connected to a drive shaft to rotate the drive shaft.

11. The drive device of claim 10, wherein the drive shaft is coupled via the first clutch to the first sun gear, the first sun gear being in tooth engagement with the first gear.

12. The drive device of claim 11, wherein the drive shaft is coupled via the second clutch to the second sun gear, wherein the second sun gear is in tooth engagement with the second gear.

13. The drive device of claim 12, wherein the third gear is in tooth engagement with an internal gear fixed to a housing to rotate with the housing.

14. An electrical drive axle for a motor vehicle comprising:
a drive machine; and
a transmission device having a triple planetary gear set and having a first and second clutch, wherein the triple planetary gear set has a plurality of triple planet gears, wherein each triple planet gear includes a first gear, a second gear, and a third gear, wherein the first gear, second gear, and third gear are connected to each other for conjoint rotation and are jointly rotatably accommodated on a planet carrier, wherein the drive machine is selectively connected to the triple planetary gear set by the second clutch and a second sun gear and wherein the first clutch and second clutch are configured to realize a first transmission ratio in response to closing of the first clutch and opening of the second clutch, wherein opening of the first and second clutch realize a transmission freewheel and a closing of the first and second clutch realizes a transmission lock.

15. The electrical drive axle of claim 14, wherein the first clutch and second clutch are further configured to realize a second transmission ratio in response to closing of the second clutch and opening of the first clutch.

16. The electrical drive axle of claim 14, wherein the electrical drive axle includes a third clutch arranged between the drive machine and a drive shaft and configured to decouple the drive machine from the transmission device in response to a transmission lock.

17. The electrical drive axle of claim 14, wherein the drive machine is an electrical machine with a stator and a rotor.

18. The electrical drive axle of claim 14, wherein the third gear is in tooth engagement with an internal gear fixed in a stationary manner.

* * * * *